(12) United States Patent
Osborne

(10) Patent No.: US 11,572,907 B2
(45) Date of Patent: Feb. 7, 2023

(54) SHEAR PIN FOR PANEL STRUCTURAL SUPPORT

(71) Applicant: THE BOEING COMPANY, Chicago, IL (US)

(72) Inventor: John C. Osborne, Bothell, WA (US)

(73) Assignee: The Boeing Company, Chicago, IL (US)

( * ) Notice: Subject to any disclaimer, the term of this patent is extended or adjusted under 35 U.S.C. 154(b) by 687 days.

(21) Appl. No.: 16/420,747

(22) Filed: May 23, 2019

(65) Prior Publication Data

US 2020/0370578 A1  Nov. 26, 2020

(51) Int. Cl.
*F16B 19/00* (2006.01)
*F16B 5/01* (2006.01)
*B32B 3/12* (2006.01)

(52) U.S. Cl.
CPC ............... *F16B 5/01* (2013.01); *B32B 3/12* (2013.01); *F16B 19/00* (2013.01); *B32B 2250/03* (2013.01); *B32B 2250/40* (2013.01); *B32B 2260/021* (2013.01); *B32B 2260/046* (2013.01); *B32B 2262/106* (2013.01); *B32B 2605/18* (2013.01)

(58) Field of Classification Search
CPC .. F16B 5/01; F16B 19/00; F16B 31/02; F16B 31/021; F16B 41/005; B32B 3/12; B32B 2250/03; B32B 2250/40; B32B 2260/021; B32B 2260/046; B32B 2262/106; B32B 2605/18

USPC ........................................................ 411/1–3, 4
See application file for complete search history.

(56) References Cited

U.S. PATENT DOCUMENTS

| | | | | |
|---|---|---|---|---|
| 3,339,609 A * | 9/1967 | Cushman | ................... | B64C 1/12 264/261 |
| 4,984,947 A * | 1/1991 | Flauraud | ................. | F16B 19/00 411/339 |
| 5,093,957 A * | 3/1992 | Do | ........................... | E04C 2/365 52/793.1 |
| 5,240,543 A * | 8/1993 | Fetterhoff | ................. | F16B 5/01 428/116 |
| 5,536,344 A * | 7/1996 | van Dreumel | ........ | F16B 37/048 264/68 |
| 6,488,460 B1 * | 12/2002 | Smith | .................... | F16B 5/0208 411/339 |
| 11,333,190 B1 * | 5/2022 | Rice | ......................... | F16B 37/12 |
| 2014/0016302 A1 * | 1/2014 | Shin | ...................... | H05K 5/0217 361/679.01 |
| 2015/0023753 A1 * | 1/2015 | Dostinov | ................ | F16B 35/04 411/2 |

* cited by examiner

*Primary Examiner* — Roberta S Delisle
(74) *Attorney, Agent, or Firm* — Quinn IP Law

(57) ABSTRACT

A shear pin assembly for securing to a face sheet of a honeycomb core sandwich panel structure and to engage a support structure, which includes a head member having a first width dimension and a neck section secured to the head member with the neck section having a second width dimension less than the first width dimension. Further included is a flange secured to the neck section with the flange extending in a direction away from the neck section and a pin member which extends from the flange in a direction away from the head member.

20 Claims, 8 Drawing Sheets

SHEAR PIN FOR PANEL STRUCTURAL SUPPORT

FIELD

This disclosure relates to a shear pin assembly and more particularly to a shear pin assembly providing structural support to a panel with being secured to the panel and engaged to a structural support member.

BACKGROUND

A floor structure within an aircraft is often secured to and supported by an internal support structure within the aircraft such as a seat track. The material employed in constructing the floor structure often includes honeycomb core sandwich panels, which includes at least two opposing spaced apart face sheets with a honeycomb structure sandwiched or positioned between the two opposing face sheets. The honeycomb core sandwich panel provides a strong and relatively lightweight material beneficial to the operation of the aircraft. Threaded fasteners are used to extend through the honeycomb core sandwich panel and secure the honeycomb core sandwich panel to an internal structure within and aircraft such as a seat track structure. The threaded fasteners extend through the upper face sheet panel and through the lower face sheet panel, which is spaced apart from the top face sheet panel, securing the honeycomb core sandwich panel to the seat track structure.

With the threaded fasteners passing through both the upper and lower face sheets of the honeycomb core sandwich panel, the fasteners provide for both tension and shear securements of the honeycomb core sandwich panel of the floor structure. Generally the securement requirements with respect to a tension load for the floor structure is less demanding than securement requirements with respect to a shear load for the floor structure. As a result, a larger number of the fasteners are employed, which extend through both the top and bottom face sheet of the honeycomb core sandwich panel so as to accommodate the shear load requirements than would otherwise be needed to accommodate tension load requirements.

There is a need to reduce the number of fasteners employed in securing a floor structure and still accommodate tension and shear design load requirements. A reduction in the number of fasteners that extend through both the top and bottom face sheet of the honeycomb core sandwich panel would reduce the time and labor involved in installing the floor structure within an aircraft at the time of fabricating the aircraft and with respect to maintenance of the aircraft in replacing portions of the floor structure during the life of the aircraft. In addition, it would be beneficial to reduce the number of fasteners that extend through the top face sheet, based on the lower tension design requirements and also thereby subjecting less fasteners to environmental demands of the fasteners which extend through top face sheet of the floor structure in an aircraft and reducing the number of fasteners needed to be replaced as a result of exposure to such environmental demands and at the same time provide for the higher shear design requirements for floor structure securement.

SUMMARY

An example includes a shear pin assembly for securing to a face sheet of a honeycomb core sandwich panel structure and to engage a support structure, which includes a head member having a first width dimension and a neck section secured to the head member with the neck section having a second width dimension less than the first width dimension. Further included to the shear pin assembly is a flange secured to the neck section with the flange extending in a direction away from the neck section and a pin member which extends from the flange in a direction away from the head member.

Another example includes a method for installing a shear pin assembly to secure to a face sheet of a honeycomb core sandwich panel structure and to engage a support structure, including a step of pushing a head member of a shear pin assembly through an opening defined by an inner wall surface of the face sheet of the honeycomb core sandwich panel structure, wherein the shear pin assembly includes the head member which includes a first width dimension. The shear pin assembly further includes a neck section secured to the head member with the neck section having a second width dimension less than the first width dimension and a flange secured to the neck section with the flange extending in a direction away from the neck section. The shear pin assembly also includes a pin member which extends from the flange in a direction away from the head member. The method further includes positioning the pin member into an opening defined by the support structure.

The features, functions, and advantages that have been discussed can be achieved independently in various embodiments or may be combined in yet other embodiments further details of which can be seen with reference to the following description and drawings.

DESCRIPTION

Figure 1:
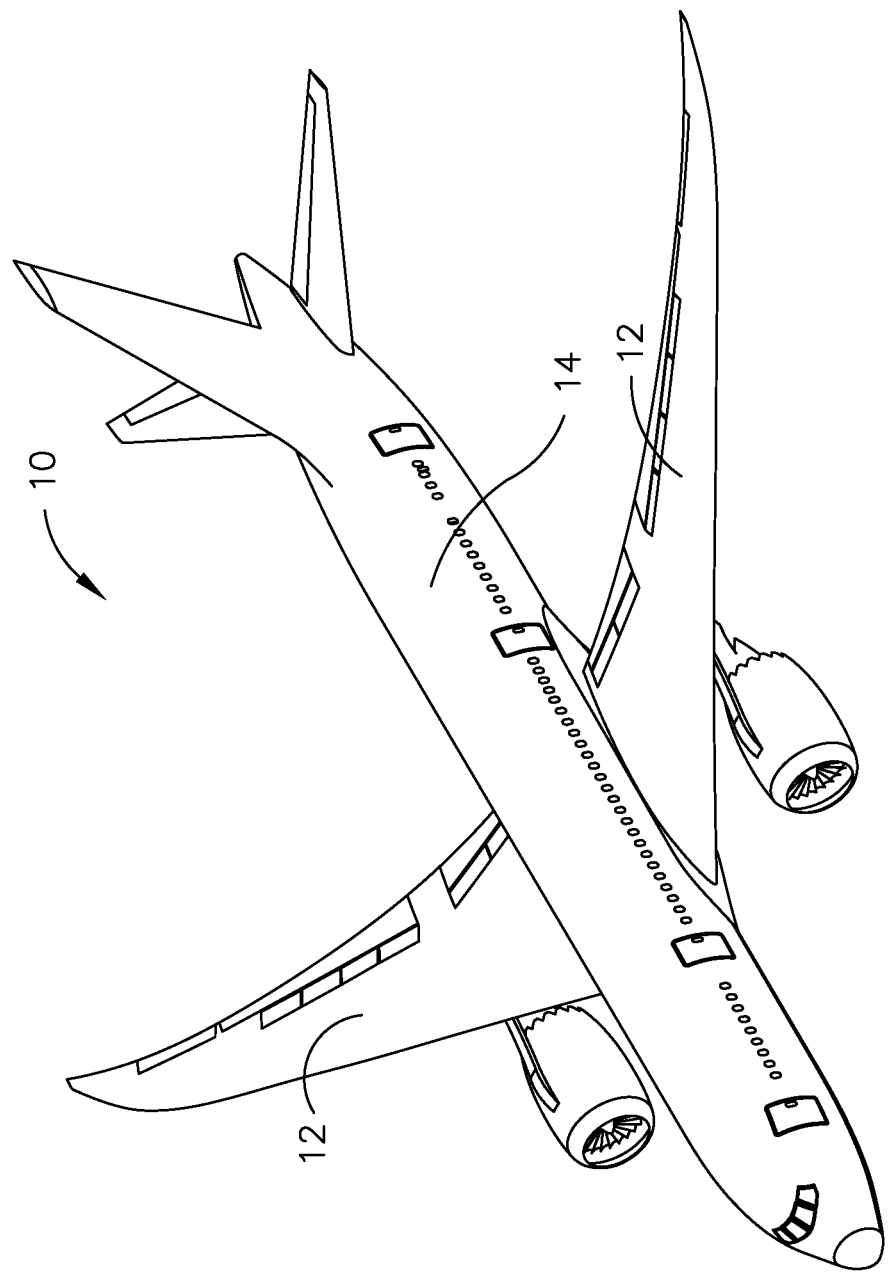
FIG. 1 a perspective view of an aircraft which utilizes the shear pin assembly of this disclosure for providing shear resistance to a floor structure within the aircraft.

In referring to FIG. 1, the design of aircraft 10, as with other transportation vehicles, has design load demand requirements with respect to various structures of the vehicle. Design load demand requirements are provided for structures in aircraft 10 such as for example wings 12, fuselage 14 as well as for securement of internal structures such as for floor structures and seating.

In securement of a floor structure, such as for example constructed of panels of honeycomb core sandwich panel structures, there is a need to accommodate both certain shear and tension design demand load requirements for the floor structure. In aircraft 10, shear load design demand requirements are greater than tension load design demand requirements for the floor structure. As mentioned earlier, fasteners were employed that would pass through both a top face sheet and a bottom face sheet of honeycomb core sandwich panel structure used in the construction of a floor structure within aircraft 10 to accommodate both the tension and shear load demand requirements with the fasteners. However, with a shear pin assembly employed, as discussed in this disclosure, shear resistance is provided to meet the shear design demand load requirements for floor structure securement. The shear pin assembly is secured to the bottom face sheet of the honeycomb core sandwich panel without extending through the top face sheet of the honeycomb core sandwich panel structure so as to receive the shear forces presented by the floor structure through the bottom face sheet. The shear pin assembly in turn is engaged to a structure and in this example to a seat track structure of aircraft 10, thereby connecting honeycomb core sandwich panel structure to the seat track structure of aircraft 10, such that shear force applied by the floor structure is transferred through the shear pin assembly to the seat track structure to which shear pin assembly is engaged.

Employment of the shear pin assembly through the bottom face sheet to confront shear loads exerted from the floor structure reduces the number of fasteners that would be otherwise used to secure through both the top face sheet and through the bottom face sheet of the honey comb sandwich core panel structure, which were used to confront both tension and shear loads. With the lesser tension design load demand requirements than shear design load demand requirements, a reduced number of fasteners are needed that extend through both the top and bottom face sheet of the honeycomb core panel structure to confront tension design load demand requirements. With less fasteners extending through the top face sheet of the honey comb core panel, less fasteners are needed to be installed through both the top and bottom face sheets by the installer providing a cost savings in installation and resulting in less fasteners being exposed through the top face sheet which are exposed to environmental demands from a floor surface within aircraft 10, which accelerates the useful life of the fastener.

Figure 2:
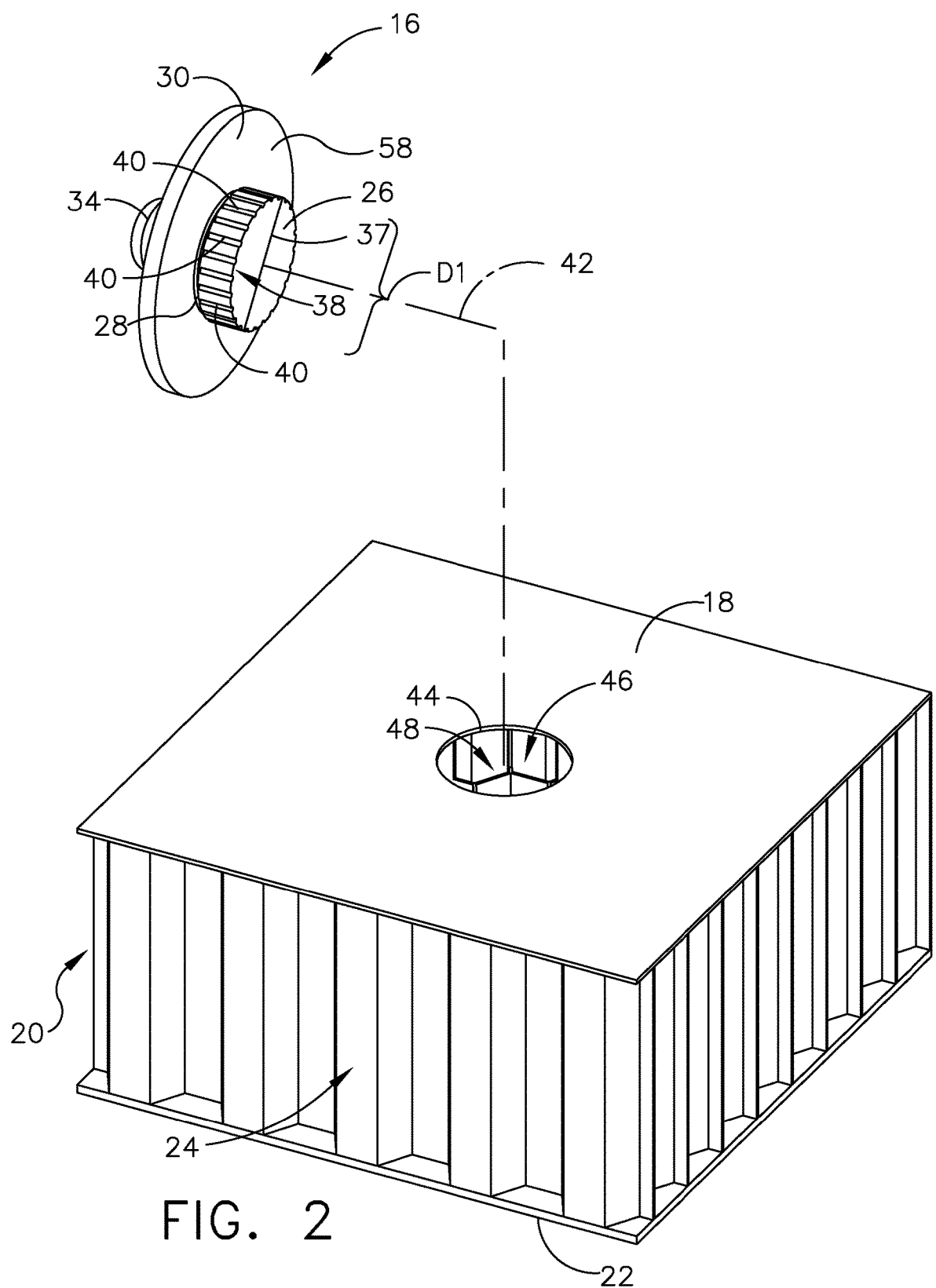
FIG. 2 is a bottom perspective partial cut away view of a honeycomb core sandwich panel structure used in constructing a floor structure within the aircraft of FIG. 1 with a shear pin assembly in an exploded angled position relative to the honeycomb core sandwich panel structure.
Figure 3:
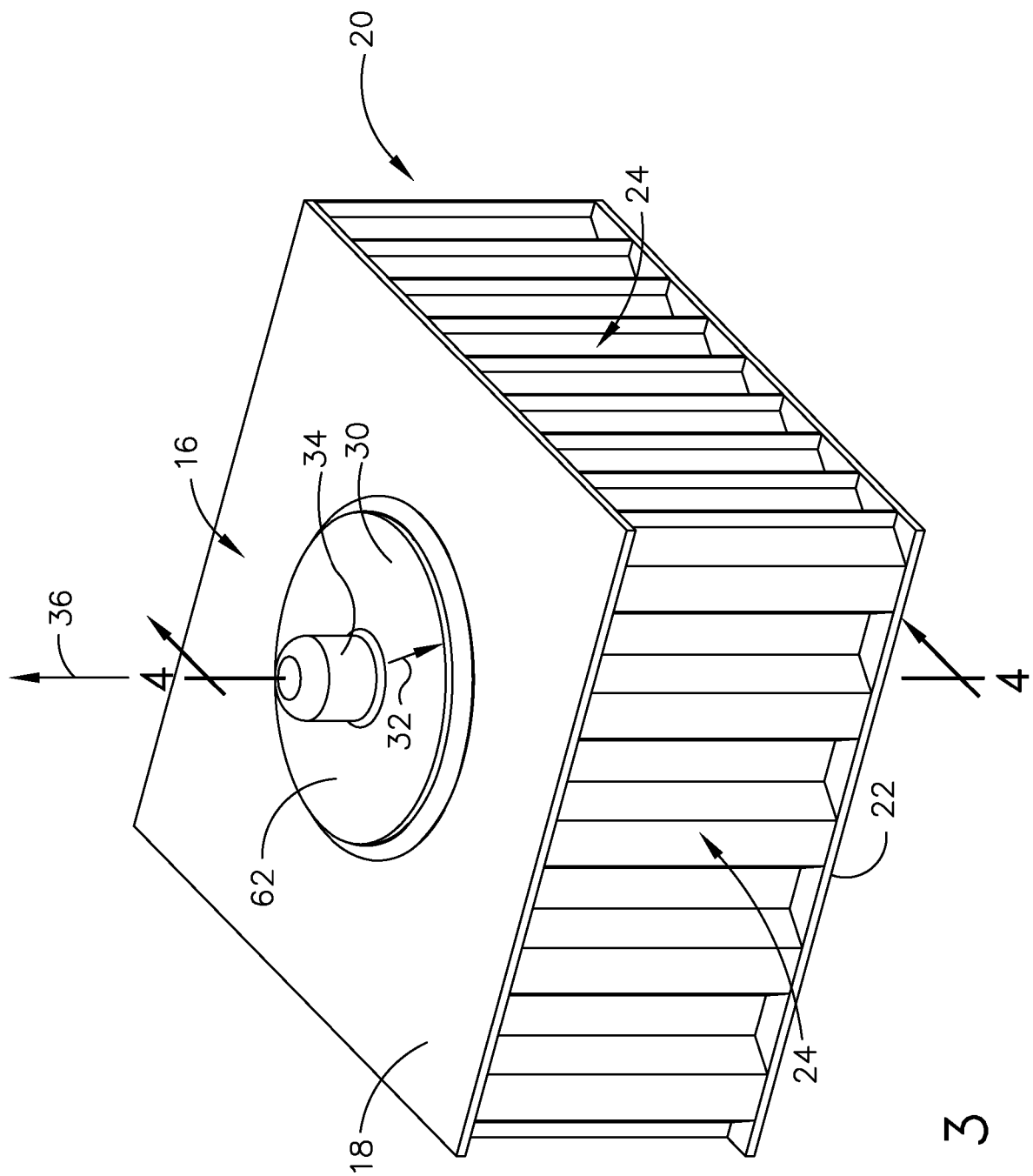
FIG. 3 is the honeycomb core sandwich panel structure of FIG. 2 with the shear pin assembly positioned secured to the honeycomb core sandwich panel structure.
Figure 4:
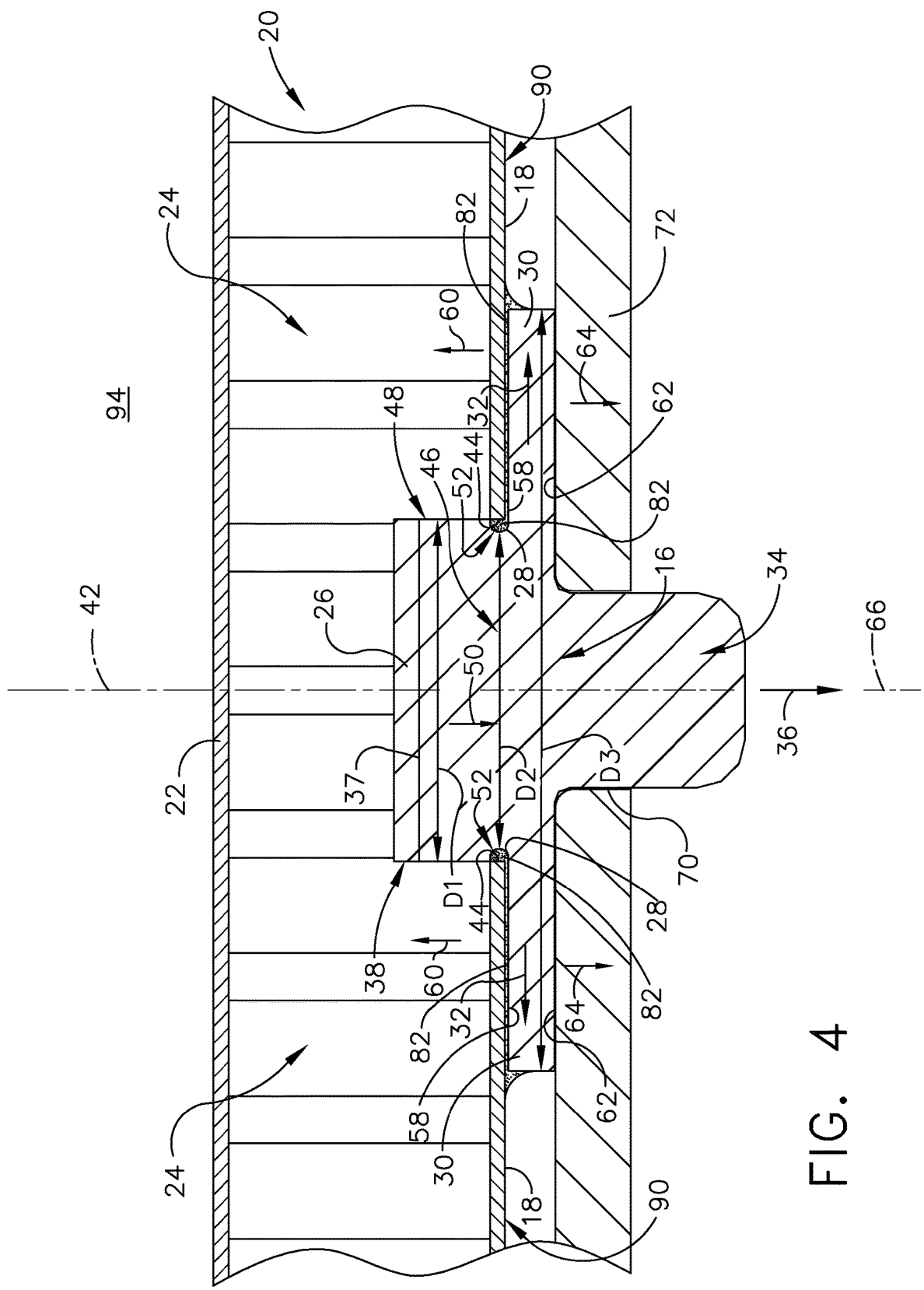
FIG. 4 is a cross section along line 4-4 of FIG. 3.

In referring to FIGS. 2-4, a first example of shear pin assembly 16 is shown for securing to bottom face sheet 18 of honeycomb core sandwich panel structure 20. Shear pin assembly 16 can be constructed of one of a wide variety of materials such as plastic, aluminum, titanium, corrosion resistant steel or other suitable materials to provide sufficient shear resistance and corrosion resistance to meet design shear load demand requirements. Honeycomb core sandwich panel structure 20 can take on numerous design configurations and in this example, honeycomb core sandwich panel structure 20 is constructed of opposing panels such as bottom face sheet 18 and top face sheet 22 constructed of composite carbon reinforced fiber. Honeycomb core 24 is positioned sandwiched between bottom and top face sheets 18, 22 and has a honeycomb or open cell configured construction, which can be constructed from one or more of a number of materials such as Kevlar, a federally registered trademarked material of E.I. DuPont de Nemours and Company, Nomex a federally trademarked material of also E.I. DuPont de Nemours and Company or any number of materials which can provide strength, be lightweight and/or provide fire resistant characteristics, based on the construction requirements to be met in fabricating aircraft 10.

As seen in FIG. 4, shear pin assembly 16 further includes head member 26 having a first width dimension D1, as seen in FIG. 4 and neck section 28 secured to head member 26 with neck section 28 having second width dimension D2, which is less than first width dimension D1. Further included with respect to shear pin assembly 16 is flange 30 secured to neck section 28 with flange 30 extending in a direction 32, away from neck section 28. Pin member 34 extends from flange 30 in direction 36 away from head member 26. In this first example, shear pin assembly 16 has a unitary or single construction.

First width dimension D1 of head member 26 includes diameter 37 being a diameter of head member 26 having a circular configuration. In this first example of shear pin assembly 16, neck section 28, flange 30 and pin member 34 each have a circular configuration. The circular configuration of head member 26 defines rim portion 38 which extends circumferentially about head member 26. Rim portion 38 defines plurality of knurls 40, as seen in FIG. 2, which extend from rim portion 38 of head member 26. Plurality of knurls 40 extend from head member 26, such that outermost ends of knurls 40 distal from, in this example, central axis 42 of head member 26, abut inner wall surface 44 of opening 46 defined by bottom face sheet 18.

Opening 46 has been reamed or drilled through bottom face sheet 18 to have a predetermined dimension and also includes removing a portion of honeycomb core 24 such that honeycomb core 24 defines space 48 within honeycomb core 24, which is aligned with opening 46. The predetermined dimension of opening 46 permits plurality of knurls 40 to create interference friction with inner wall surface 44 of opening 46 of bottom face sheet 18 with installer pushing head member 26 through opening 46 of bottom face sheet 18 and positioning head member 26 into space 48 defined by honeycomb core 24, wherein a portion of the honeycomb core 24 has been removed, as seen in FIG. 4.

Neck section 28 of shear pin assembly 16 extends from head member 26 in transverse direction 50 with respect to first width dimension D1 of head member 26. Neck section 28 defines curved surface 52 which extends away from head member 26 along transverse direction 50. Flange 30 has third width dimension D3 greater than second width dimension D2 of neck section 28, wherein flange 30 extends in direction 32 away from pin member 34. Flange 30 defines first surface 58 which faces in direction 60 toward head member 26 and defines second surface 62 which faces in direction 64 away from head member 26. Pin member 34 extends in direction 36, which is away from flange 30 and transverse, in this example, to width dimension D3 and has central axis 66 aligned with central axis 42 of head member 26. Pin member 34 is positioned in opening 70 defined by support structure or in this example seat track structure 72 such that shear force exerted by bottom face sheet 18 against shear pin assembly 16 is resisted by seat structure or seat track structure 72.

Figure 5:
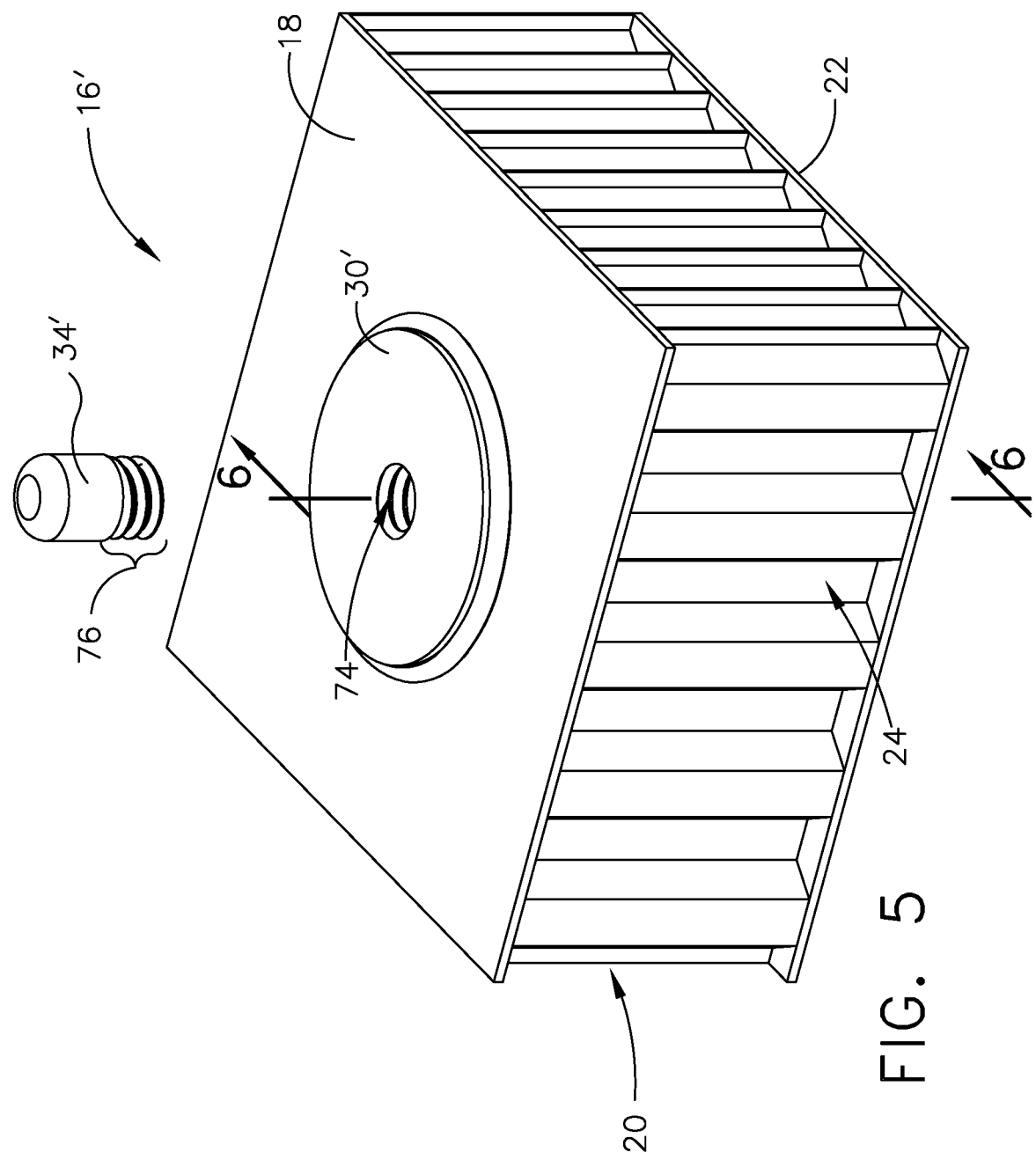
FIG. 5 is a bottom perspective partial cut away view of a honeycomb core sandwich panel structure used in constructing a floor structure within the aircraft of FIG. 2 with a portion of a second example of a shear pin assembly exploded position from a remainder of the shear pin assembly positioned on the honeycomb core sandwich panel structure.
Figure 6:
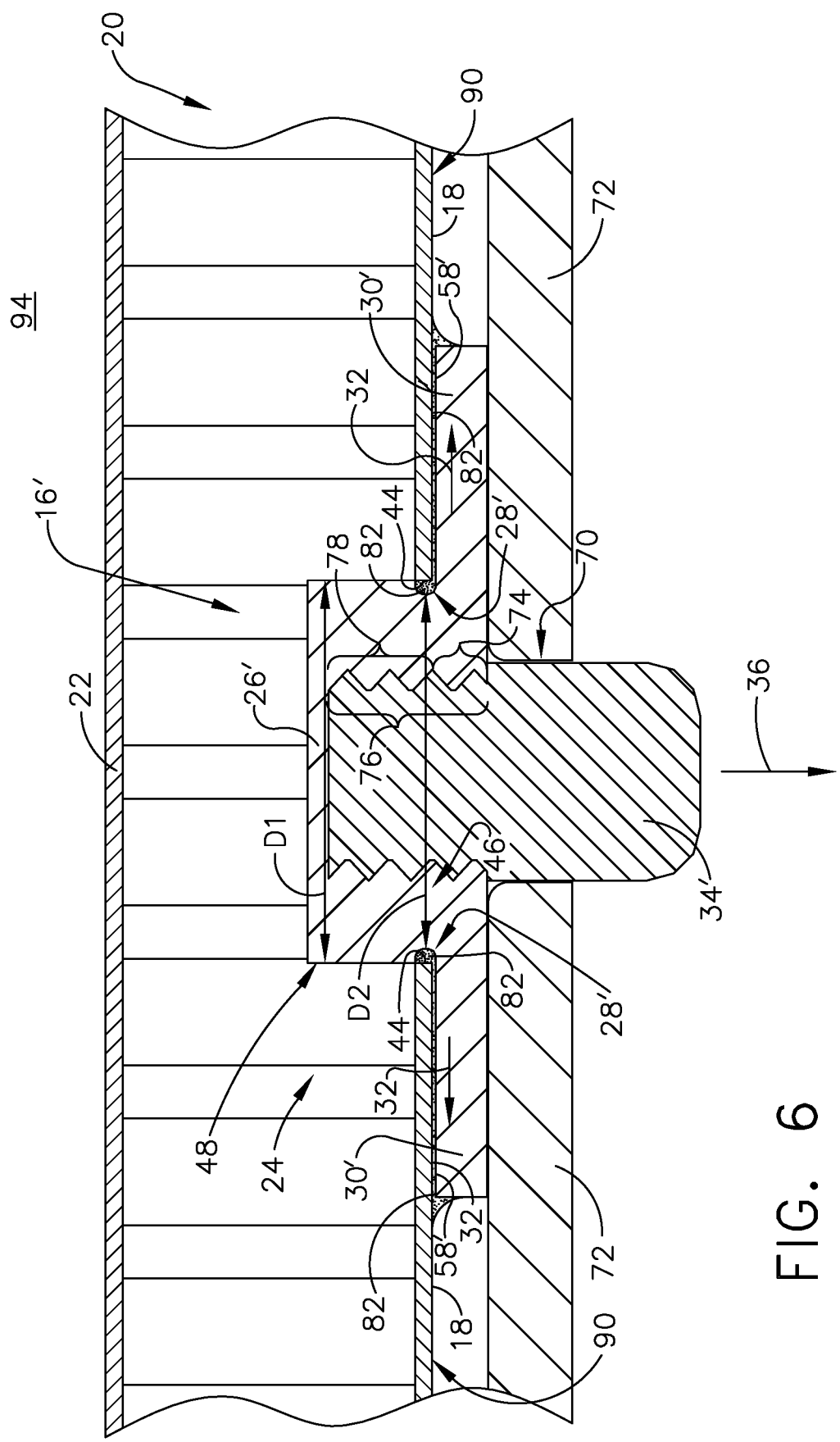
FIG. 6 is a cross section along line 6-6 in FIG. 5 of the second example of the shear pin assembly engaging the honeycomb core sandwich panel structure to a support structure.

In referring to FIGS. 5 and 6, second example of shear pin assembly 16' is shown. Flange 30' defines first set of threads 74 and pin member 34' defines second set of threads 76 wherein first set of threads 74 and second set of threads 76 have compatible configurations to engage one another. Shear pin assembly 16' further includes additional threads 78 defined by neck section 28' and head member 26', which includes further additional threads 78 defined by neck section 28' and head member 26' which have a compatible configuration with second set of threads 76 of pin member 34'. This second example of shear pin assembly 16' provides installer the flexibility of installing pin member 34' to shear pin assembly 16' at an optimal time when installing shear pin assembly 16' into opening of bottom face sheet 18 and positioning pin member 34' into opening 70 of support structure or seat track structure 72. Except for the threaded engagement of pin member 34' to second shear pin assembly 16', first and second examples of shear pin assembly 16, 16' are similar in configuration, orientation and securement as described above with respect to first example of shear pin assembly 16 and with respect to securement to honeycomb core sandwich panel structure 20 and engagement with respect to support structure or seat track structure 72 as seen in FIGS. 4 and 6.

In installing either first or second example of shear pin assembly 16, 16', an installer will apply an adhesive 82 to first surface 58 of flange 30 and about neck section 28 of first example of shear pin assembly 16, as seen in FIG. 4, and to first surface 58' of flange 30' and about neck section 28' of second example of shear pin assembly 16', as seen in FIG. 6. With adhesive 82 positioned in first example of shear pin assembly 16, head member 26 is pushed through opening 46 of bottom face sheet 18, as seen in FIG. 4, positioning adhesive 82 in contact with bottom face sheet 18 and in contact with inner wall surface 44 of opening 46 of bottom face sheet 18. Similarly, with adhesive 82 positioned on flange 30' and neck portion 28' in second example of shear pin assembly 16' head member 26' of second example of shear pin assembly 16' is pushed through opening 46 of bottom face sheet 18, as seen in FIG. 6, positioning adhesive 82 in contact with bottom face sheet 18 and inner wall surface 44 of opening 46. With allowing adhesive 82 time to cure, shear pin assembly 16, 16' is firmly secured to bottom face sheet 18 with head member 26, 26' positioned within space 48 defined by honeycomb core 24 of honeycomb core sandwich panel structure 20. Shear forces exerted by bottom face sheet 18 are securely transmitted through shear pin assembly 16, 16' to support structure or seat track structure 72 to provide the shear load demand requirements for the floor structure securement.

Figure 8:
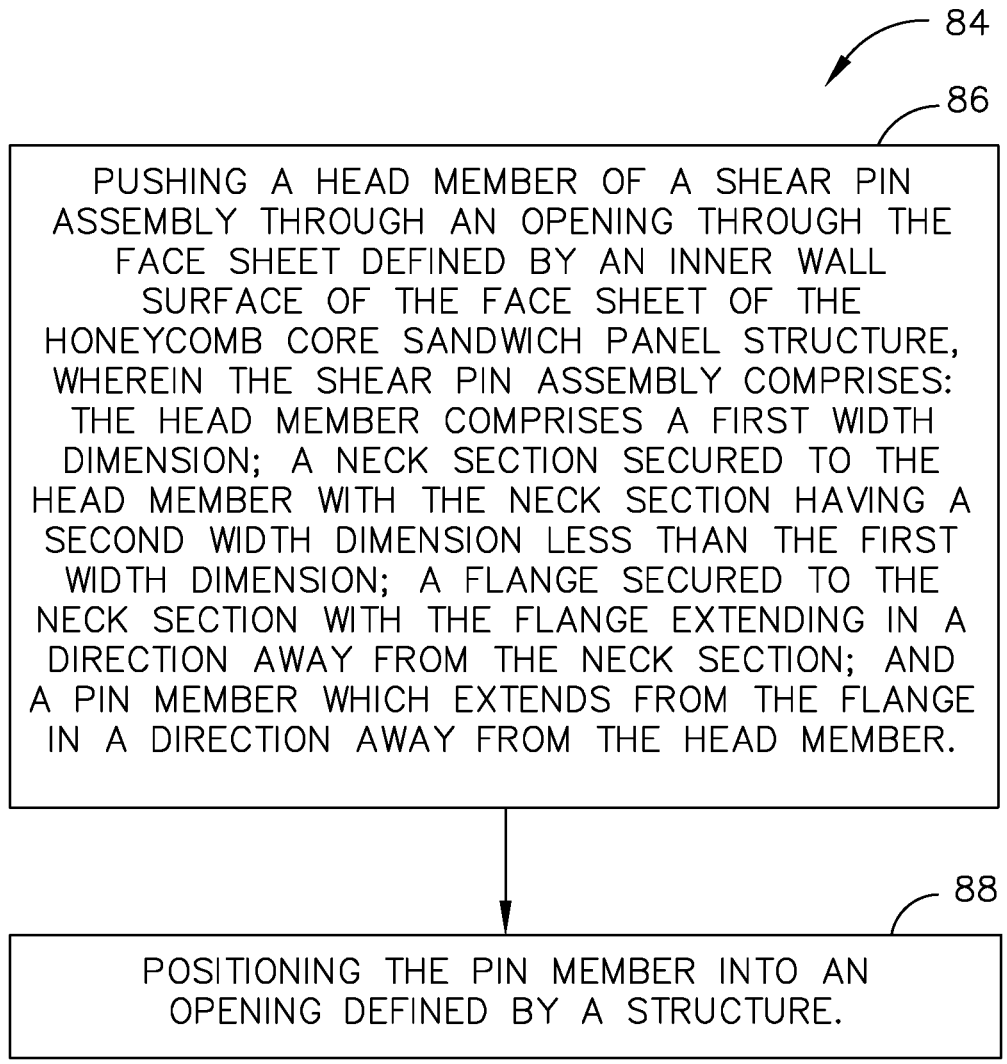
FIG. 8 is a flow chart of a method for installing a shear pin assembly secured to a face sheet of a honeycomb core sandwich panel structure and to engage a support structure.

In referring to FIG. 8, method 84 for installing first or second example of shear pin assembly 16, 16' to secure to a face sheet, and in this example of bottom face sheet 18, of honeycomb core sandwich panel structure 20 and to engage a support structure or in this example seat track structure 72, includes step 86 of pushing head member 26 of first example of shear pin assembly 16 or pushing head member 26' of second example of shear pin assembly 16' through opening 46 defined by bottom face sheet 18 of the honeycomb core sandwich panel structure 20. First example of shear pin assembly 16 includes head member 26 having first width dimension D1 and neck section 28 secured to head member 26 with neck section 28 having second width dimension D2, which is less than first width dimension D1, as seen in FIG. 4. Shear pin assembly 16 further includes flange 30 secured to neck section 28 with flange 30 extending in the direction 32 away from neck section 28 and pin member 34 which extends from flange 30 in direction 36 away from head member 26. Second example of shear pin assembly 16', as seen in FIGS. 5 and 6, includes head member 26' having first width dimension D1 and neck section 28' secured to head member 26' with neck section 28' having second width dimension D2, which is less than first width dimension D1. Second example of shear pin assembly 16' further includes flange 30' secured to neck section 28' with flange 30' extending in direction 32 away from neck section 28' and pin member 34' which extends from flange 30' in direction 36 away from head member 26'. Method 84 further includes step 88 of positioning pin member 34 of first example of shear pin assembly 16 or pin member 34' of second example of shear pin assembly 16', into opening 70 defined by support structure such as seat track structure 72 as seen in FIGS. 2-6.

Head member 26 and head member 26' of first and second shear pin assembly 16 and 16', respectively, define a plurality of knurls 40 which extend from head member 26, 26'. The plurality of knurls 40 provide friction, as described earlier, between plurality of knurls 40 and inner wall surface 44 of opening 46 defined by, in this example, bottom face sheet 18. With pushing head member 26, 26' of the first and second example of shear pin assembly 16 and 16', respectively through opening 46 of bottom face sheet 18 an interference friction between plurality of knurls 40 and inner wall surface 44 of opening 46 is experienced.

Step 86 of pushing head member 26 of first example of shear pin assembly 16 further includes positioning adhesive 82 on first surface 58 of flange 30 facing head member 26 and on neck section 28, in this example, prior to pushing head member 26 through opening 46 of bottom face sheet 18. Similarly, step 86 of pushing head member 26' of second example of shear pin assembly 16' includes positioning adhesive 82 on first surface 58' of flange 30' facing head member 34' and on neck section 28', this example, prior to pushing head member 26' through opening 46 of bottom face sheet 18.

Step 86 of pushing of head member 26 further includes positioning adhesive 82 on first surface 58 of the flange 30 of first example of shear pin assembly 16 in contact with first surface 90 of a face sheet, which in this example is bottom face sheet 18, which facilitates securing flange 30 to bottom face sheet 18. This is similarly the arrangement for second example of shear pin assembly 16' wherein step 86 of pushing head member 26' further includes positioning adhesive on first surface 58' on flange 30' in contact with first surface 90 of bottom face sheet 18, which facilitates securing flange 30' to bottom face sheet 18.

Step 86 of pushing head member 26 further includes positioning adhesive 82 on neck section 28 in contact with the inner wall surface 44 of bottom face sheet 18 defining opening 46 of honeycomb core sandwich panel structure 20, which facilitates securing neck section 28 to inner wall surface 44 of bottom face sheet 18. This arrangement is similar for neck section 28' of second example of shear pin assembly 16' of positioning adhesive 82 on neck section 28' in contact with inner wall surface 44 of bottom face sheet 18 defining opening 46 of honeycomb core sandwich panel structure 20, which facilitates securing neck portion 28' to inner wall surface 44 of bottom face sheet 18.

Step 86, with respect to first example of shear pin assembly 16, further includes curing adhesive 82 securing flange 30 to first surface 90 of bottom face sheet 18 of the honeycomb core sandwich panel structure 20 and securing neck section 28 to inner wall surface 44 of bottom face sheet 18 of honeycomb core sandwich panel structure 20. With respect to second example of shear pin assembly 16', step 86 further includes curing adhesive 82 securing flange 30' to first surface 90 of bottom face sheet 18 of honeycomb core sandwich panel structure 20 and securing neck section 28' to inner wall surface 44 of bottom face sheet 18 of honeycomb core sandwich panel structure 20. With curing of adhesive 82, shear load transfer from bottom face sheet 18 is securely transferred to shear pin assembly 16, 16' and to support structure or seat track structure 72.

With shear pin assembly 16, 16' is secured to bottom face sheet 18 of honeycomb core sandwich panel structure 20, installer utilizes pin member 34, 34' respectively to engage a structure within aircraft 10. In this example, with employing first or second example of shear pin assembly 16, 16', shear pin assembly 16, 16' provides sufficient shear load design demand requirements for the floor structure, with shear pin assembly 16, 16' engaging support structure or seat track structure 72 with pin member 34, 34' extending through opening 70 of seat track structure.

Figure 7:
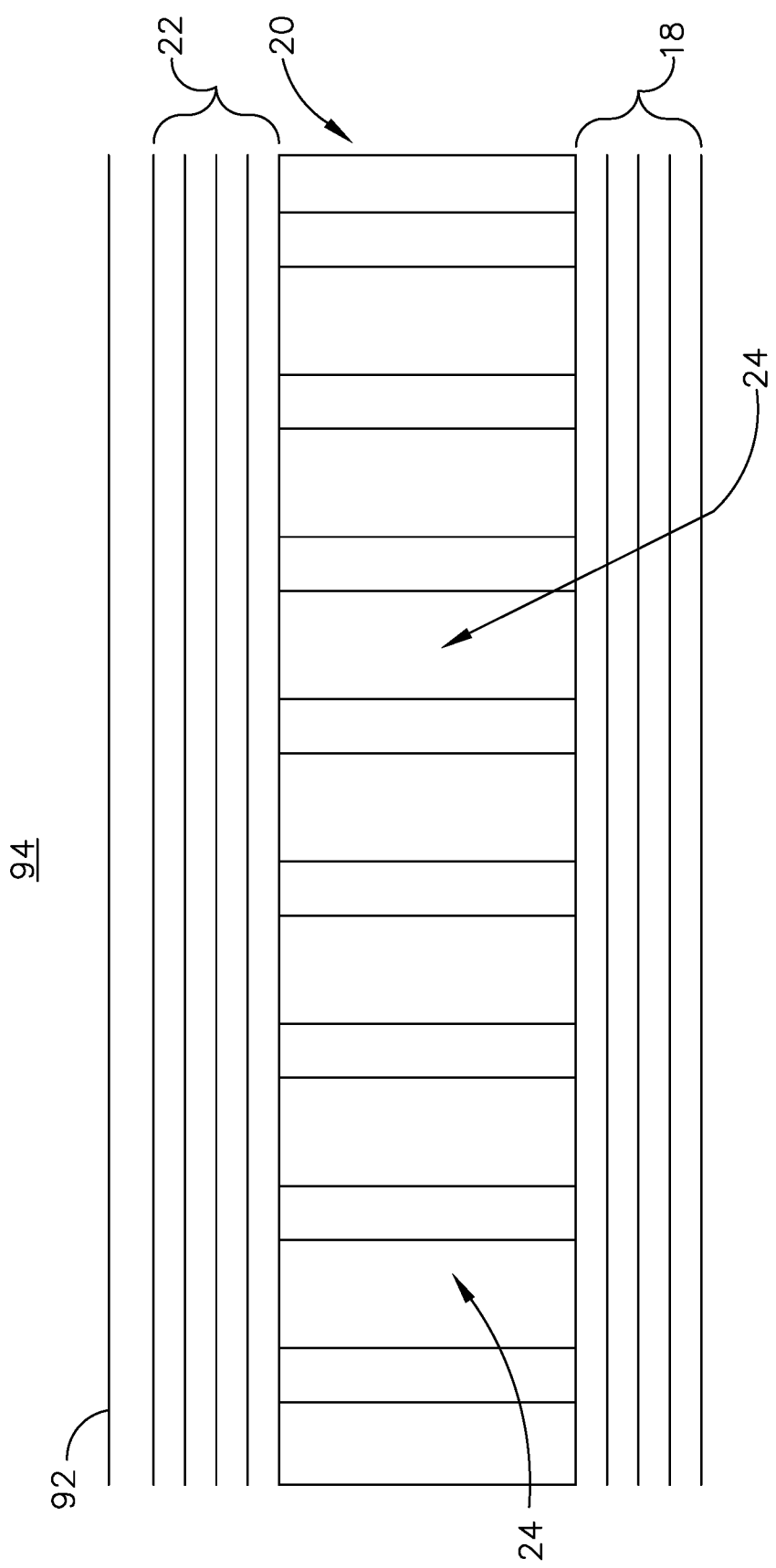
FIG. 7 is a schematic cross section view of the honeycomb core sandwich panel structure of FIG. 2.

Method 84 further includes, as seen in FIG. 7, honeycomb core sandwich panel structure 20 further including a durable layer constructed in this example of layer of fiberglass 92 which overlies and is secured to top face sheet 22. Securement of layer of fiberglass 92 to top face sheet 22 can be secured with an adhesive. Layer of fiberglass 92 provides additional protection to threaded fasteners (not shown), which extend through both top and bottom face sheets 22, 18 of honeycomb core sandwich panel structure 20, from environmental demands placed on such fasteners from within interior 94 of aircraft 10. Environmental demands can include foot traffic, spilled liquids and other similar environmental demands. These fasteners which are protected by layer of fiberglass 92 provide tension demand load requirements for the floor structure and also provide some shear demand load requirements.

While various embodiments have been described above, this disclosure is not intended to be limited thereto. Variations can be made to the disclosed embodiments that are still within the scope of the appended claims.

What is claimed:

1. A shear pin assembly for securing to a face sheet of a honeycomb core sandwich panel structure and to engage a support structure, comprising:
    a head member having a first width dimension, and a rim portion which extends circumferentially about the head member with a plurality of knurls which extend from the rim portion;
    a neck section secured to the head member with the neck section having a second width dimension less than the first width dimension;
    a flange secured to the neck section with the flange extending in a direction away from the neck section; and
    a pin member which extends from the flange in a direction away from the head member.

2. The shear pin assembly of claim 1, wherein the first width dimension of the head member includes a first diameter.

3. The shear pin assembly of claim 1, wherein the neck section extends from the head member in a direction transverse with respect to the first width dimension of the head member.

4. The shear pin assembly of claim 3, wherein the neck section defines a curved surface which extends away from the head member along the direction.

5. The shear pin assembly of claim 1, wherein the flange has a third width dimension greater than the second width dimension of the neck section.

6. The shear pin assembly of claim 1, wherein the flange extends in a transverse direction to the pin member and the flange defines a first surface which faces in a direction toward the head member.

7. The shear pin assembly of claim 6, wherein the flange defines a second surface which faces in a direction away from the head member.

8. The shear pin assembly of claim 1, wherein the pin member extends in the direction away from the head member and has a central axis which is aligned with a central axis of the head member.

9. The shear pin assembly of claim 8, wherein the flange defines a first set of threads and the pin member defines a second set of threads wherein the first set of threads and the second set of threads have compatible configurations to engage one another.

10. The shear pin assembly of claim 9, further including additional threads defined by the neck section and the head member which have a compatible configuration with the second set of threads of the pin member.

11. A method for installing a shear pin assembly to secure to a face sheet of a honeycomb core sandwich panel structure and to engage a support structure, comprising a step of:
    pushing a head member of the shear pin assembly through an opening through the face sheet defined by an inner wall surface of the face sheet of the honeycomb core sandwich panel structure, wherein the shear pin assembly comprises:
    the head member which comprises a first width dimension and a rim portion which extends circumferentially about the head member with a plurality of knurls which extend from the rim portion;
    a neck section secured to the head member with the neck section having a second width dimension less than the first width dimension;
    a flange secured to the neck section with the flange extending in a direction away from the neck section; and
    a pin member which extends from the flange in a direction away from the head member; and
    positioning the pin member into an opening defined by the support structure.

12. The method of claim 11, wherein with pushing the head member of the shear pin assembly through the opening, the plurality of knurls create interference friction with the inner wall surface of the face sheet.

13. The method of claim 11, wherein pushing the head member further including positioning an adhesive on a first surface of the flange facing the head member and on the neck section.

14. The method of claim 13, wherein pushing the head member further including positioning the adhesive on the first surface of the flange in contact with a first surface of the face sheet.

15. The method of claim 14, wherein pushing the head member further including positioning the adhesive on the neck section in contact with the inner wall surface of the face sheet which defines the opening of the honeycomb core sandwich panel structure.

16. The method of claim 15, further including curing the adhesive securing the flange to the first surface of the face sheet of the honeycomb core sandwich panel structure and securing the neck section to the inner wall surface of the face sheet which defines the opening of the honeycomb core sandwich panel structure.

17. The method of claim 11, wherein the support structure comprises a seat track structure.

18. The method of claim 11, wherein the honeycomb core sandwich panel structure further including a layer of fiberglass which overlies a top face sheet of the honeycomb core sandwich panel structure.

19. The method of claim 11, wherein the flange has a third width dimension.

20. The method of claim 19, wherein the third width dimension is greater than the second width dimension on the neck section.

* * * * *